United States Patent
Hoveling

(10) Patent No.: US 7,191,891 B2
(45) Date of Patent: Mar. 20, 2007

(54) DEVICE FOR MOVING PRODUCTS WITH SELECTIVE DRIVE ENGAGEMENT

(76) Inventor: René Michaël Hoveling, Van Limburg Stirumlaan 28, NL-3445 CE Woerden (NL)

( * ) Notice: Subject to any disclaimer, the term of this patent is extended or adjusted under 35 U.S.C. 154(b) by 0 days.

(21) Appl. No.: 10/456,473

(22) Filed: Jun. 9, 2003

(65) Prior Publication Data

US 2003/0234159 A1 Dec. 25, 2003

Related U.S. Application Data

(63) Continuation-in-part of application No. 10/057,980, filed on Jan. 29, 2002, now abandoned.

(51) Int. Cl.
*B65G 15/64* (2006.01)

(52) U.S. Cl. .................. 198/345.3; 414/222.06
(58) Field of Classification Search .............. 198/345.3; 414/222.06
See application file for complete search history.

(56) References Cited

U.S. PATENT DOCUMENTS

| | | |
|---|---|---|
| 3,049,214 A | 8/1962 | Cormia et al. |
| 3,161,145 A | 12/1964 | Cargill et al. |
| 3,949,859 A | 4/1976 | Nussbaumer et al. |
| 4,088,220 A | 5/1978 | Jacksch et al. |
| 4,947,978 A | 8/1990 | Rhodes |
| 5,046,598 A * | 9/1991 | Colamussi ............... 198/465.1 |
| 5,226,524 A | 7/1993 | Guttinger et al. |
| 5,280,830 A * | 1/1994 | Schiaretti et al. ........ 198/465.3 |
| 5,584,160 A | 12/1996 | Andrea |
| 6,122,821 A | 9/2000 | Dornieden et al. |

FOREIGN PATENT DOCUMENTS

| | | | |
|---|---|---|---|
| CH | 566 249 A | | 9/1975 |
| FR | 2 705 327 A | | 11/1994 |

* cited by examiner

*Primary Examiner*—Joe Dillon, Jr.
(74) *Attorney, Agent, or Firm*—Young & Thompson

(57) ABSTRACT

Device for moving products from a loading station to an unloading station. Carriers on which containers for the products are arranged move along a guide in the direction of transport. The drive is implemented with the aid of a toothed belt and each carrier is provided with a locking pawl that is hingeably fixed thereto and that can come into engagement with the toothed belt. The locking pawl is furthermore provided with a tab on which an operating element, such as a cylinder, firmly fixed to the transport device is able to engage. A second set of teeth constructed as a toothed belt is present and this is arranged in a stationary position. The carrier is provided with a wheel running in this toothed belt. This wheel is provided with a non-return clutch.

11 Claims, 6 Drawing Sheets

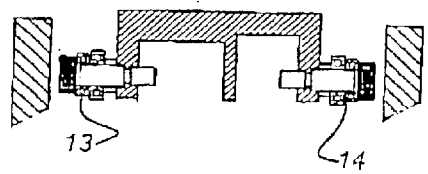
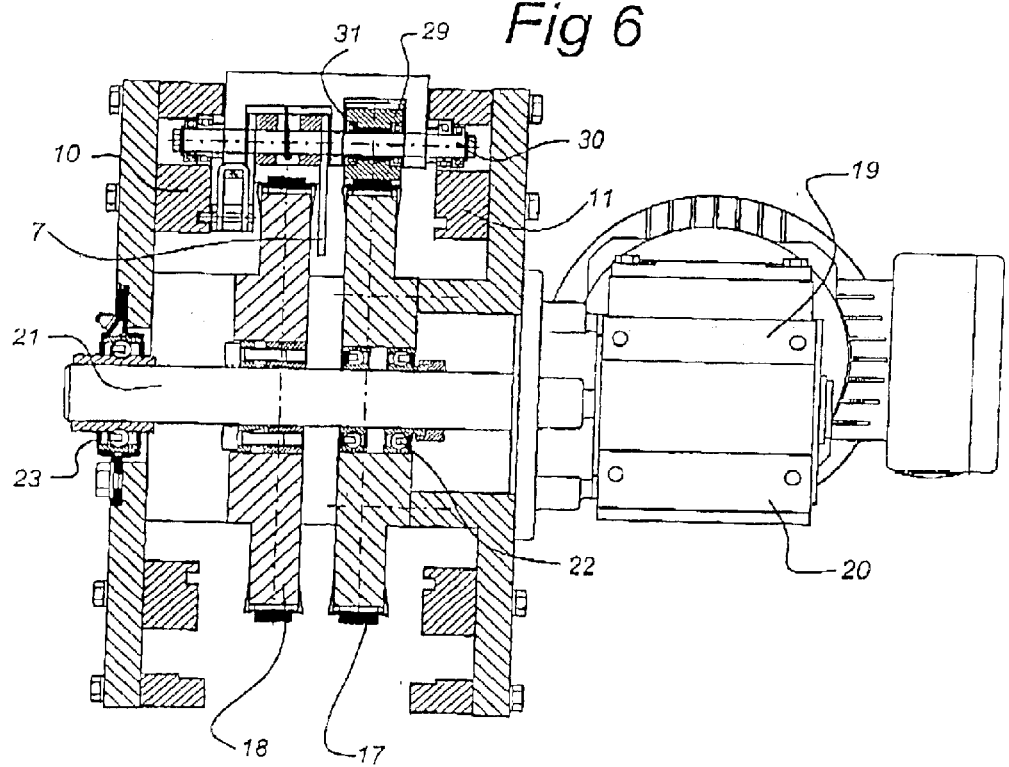

DEVICE FOR MOVING PRODUCTS WITH SELECTIVE DRIVE ENGAGEMENT

FIELD OF THE INVENTION

The invention relates to a device for moving products from a loading station to an unloading station.

BACKGROUND TO THE INVENTION

Devices for moving products from a loading station to an unloading station in a container having a multiplicity of carriers for said containers for said products, as well as a transport device for moving said containers between said loading station and unloading station and vice versa are known in the prior art. Reference is made in particular to U.S. Pat. Nos. 5,046,598 and 5,280,830. In these devices there are a large number of carriers and a continuously circulating belt or chain. The carriers engage on the belt, chain or the like by means of friction. If these have to stop in a certain position, means such as a cylinder are present which are moved into the path of the carriers. As a result a carrier is restrained and slip takes place between carrier and belt or chain. That is to say, the carrier concerned is pushed against the movable block with relatively high force. It is possible to reduce this force by reducing the grip between belt or chain and carrier, but this results in a less reliable transport when the operating means, that is to say the block, is not active. This disadvantage is greater if the front carrier of a series of carriers is restrained and the following carriers are blocked by this. Whenever a new carrier is blocked, a further frictional force is transferred to the front carrier and the force on the block increases.

From U.S. Pat. No. 5,584,160 a device for feeding articles to a package line is known comprising a number of holders removably fastened to a conveyor. A mechanical connection between the conveyor, comprising a toothed belt, and the holders it provided

SUMMARY OF THE INVENTION

The aim of the present invention is to provide a device for moving products which has a continuously operating drive and by means of which carriers are able to move with the drive or are able to remain stationary with respect to the drive, in a simple and guaranteed manner. A further aim of the present invention is to limit the forces exerted on the carriers when the latter become stationary.

A further aim of the present invention is to limit the forces exerted on the front carrier of a series of carriers when stationary.

A further aim of the present invention is to provide a construction by means of which it is possible to ensure that no movement in the direction opposed to the direction of transport can take place when the carrier is stationary.

A further aim of the present invention is to provide a construction by means of which accurate movement of the carrier together with the drive can be ensured without slip occuring.

These and further aims are achieved by means of a device for moving products from a loading station to an unloading station, comprising a multiplicity of carriers for said containers for said products, as well as a transport device for moving said containers between said loading station and said unloading station and vice versa, which transport device comprises a frame, a drive, circulating therein, for said carriers, guide means for said carriers and engagement means for bringing said carriers into engagement with said drive, wherein said drive is provided with recesses and said carrier is provided with an engagement member that extends into said recesses, operating means being present in order to move said engagement member out of the recesses, wherein said carrier and frame an provided with cooperating means allowing for displacement of said carrier in one direction relative to said frame and preventing displacement of said carrier in the opposite direction relative to said frame.

BRIEF DESCRIPTION OF THE INVENTION

The present invention will be explained in more detail below with reference to an illustrative embodiment shown in the drawing. In the drawing:

FIG. 6 shows the device according to the present invention in cross-section; and FIG. 6a shows the device according to the present invention in cross-section.

DETAILED DESCRIPTION OF THE INVENTION

The device according to the present invention is show by 1 in the figures. This device consists of a large number of carriers 2 on which containers 3 are fitted for containing products. The direction of transport of device 1 is indicated by arrow 12. Transport takes place from a loading station to an unloading station. With this arrangement it is possible for a number of carriers to accumulate at the loading station and/or unloading station and for a number of products to be placed in the containers, or removed therefrom, at the same time.

Figure 1:
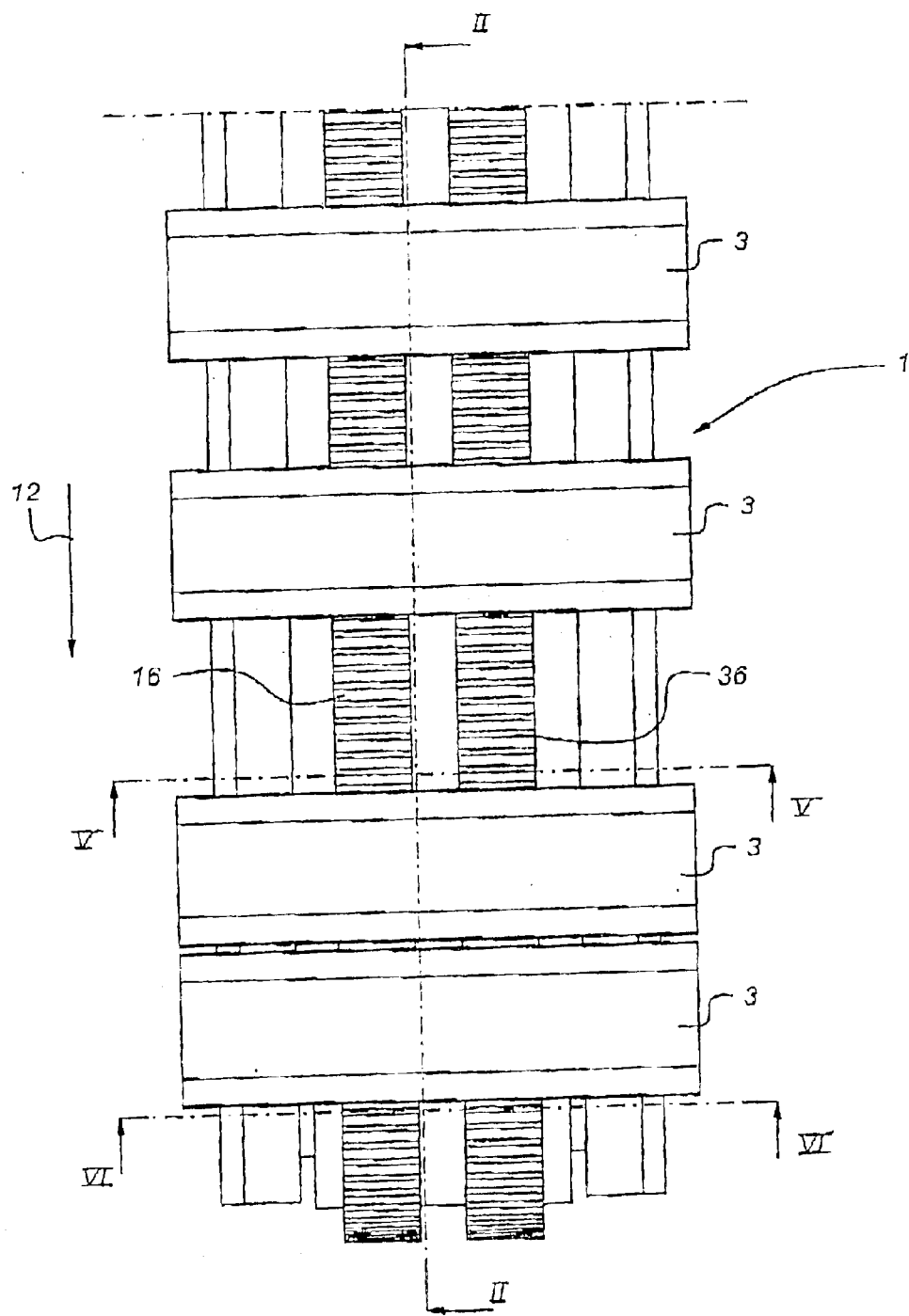
FIG. 1 shows a plan view of the device according to the invention.
Figure 2:
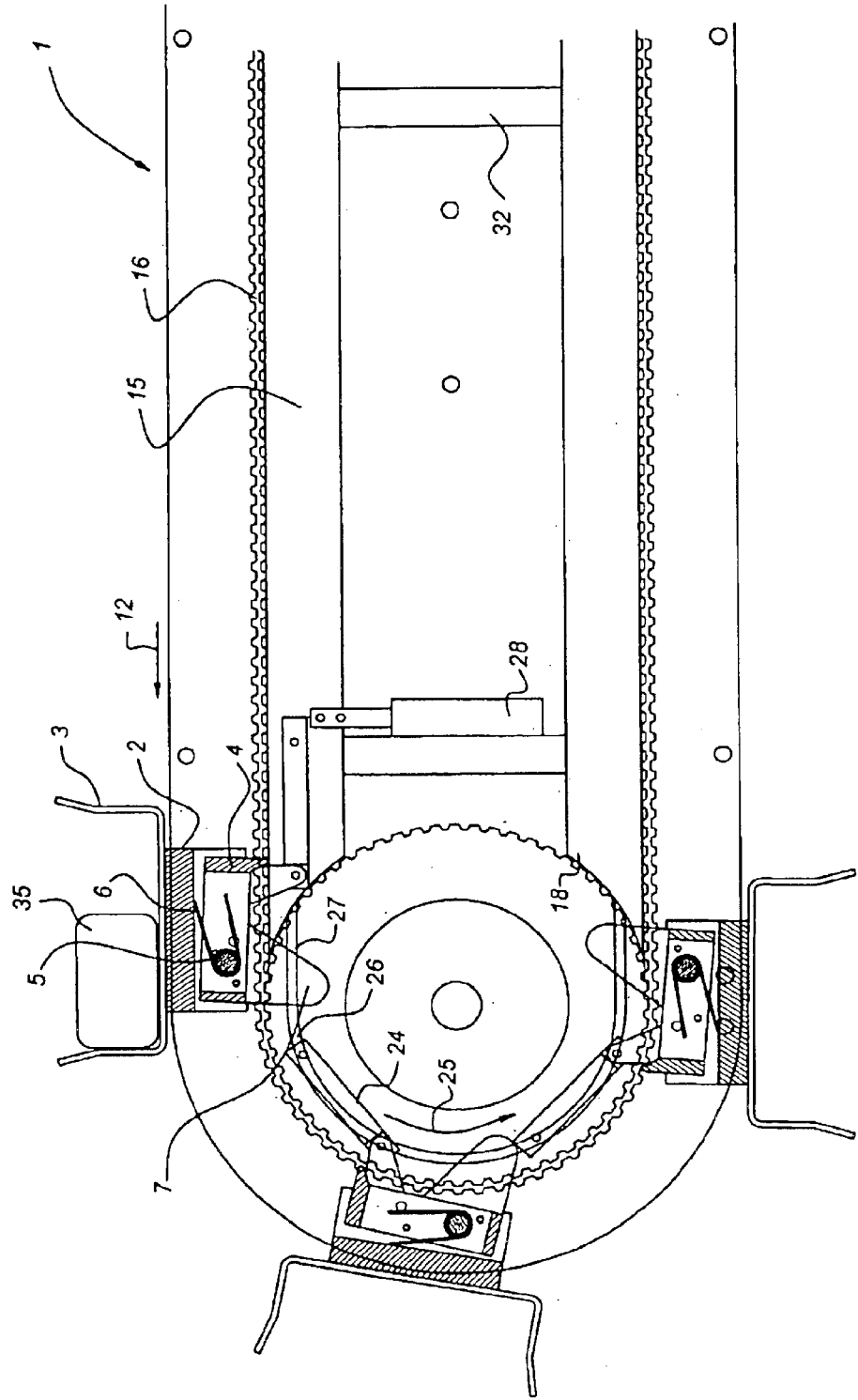
FIG. 2 shows a cross-section along the line II—II in FIG. 1.

According to the present invention a continuously circulating toothed belt 16 is present. This bait rests on a support 15 fixed to frame 32 of th device 1. There are wheels 18 (only one is shown in FIG. 2) located some distance apart, around which toothed belt 16 is wrapped. One of the wheels 18 serves for the drive. This is shown in detail in FIG. 6. Shaft 21 is driven via motor 19 and reduction gear 20. Shaft 21 is firmly fixed to wheel 18.

Figure 5:
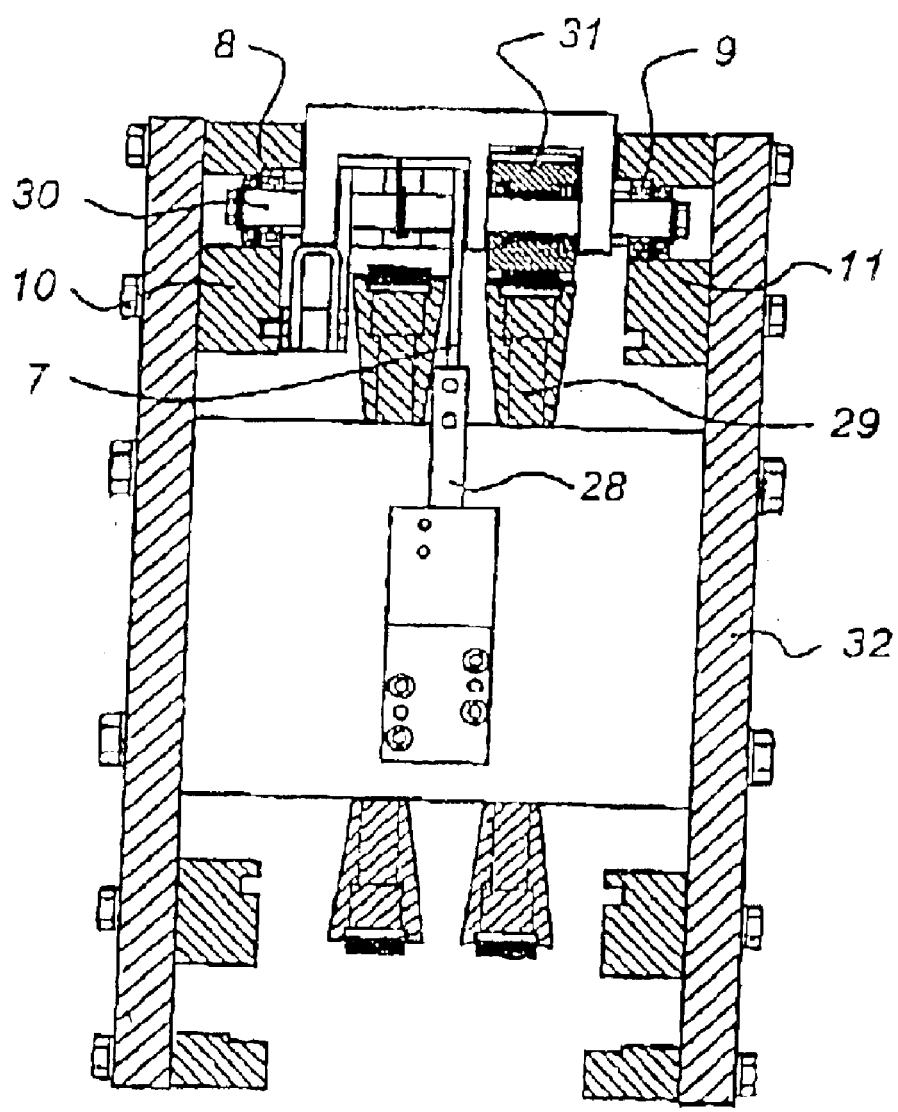
FIG. 5 shows the device according to the present invention in cross-section.

Each of the carriers 2 is provided with two shafts located some distance apart. A first shaft 30 is shown In FIGS. 5 and 6 and is provided close to the ends with bearings 8, 9 which run in guides 10, 11 of frame 32. This shaft 30 also serves as hinge pin for a locking pawl 4, whilst freewheel 29 is also fixed thereto. Shaft 30 is fitted on carrier 2 such that it cannot turn. Freewheel 29 is provided with a freewheel clutch 31.

The second shaft of carrier 2 consists of two stubs 13, 14 (FIG. 6a), both provided with bearings. Like shaft 30, these run in guides 10 and 11. In this way it is ensured that the carrier 2 describes a predetermined path some distance away from the toothed belt 16.

Figure 3:
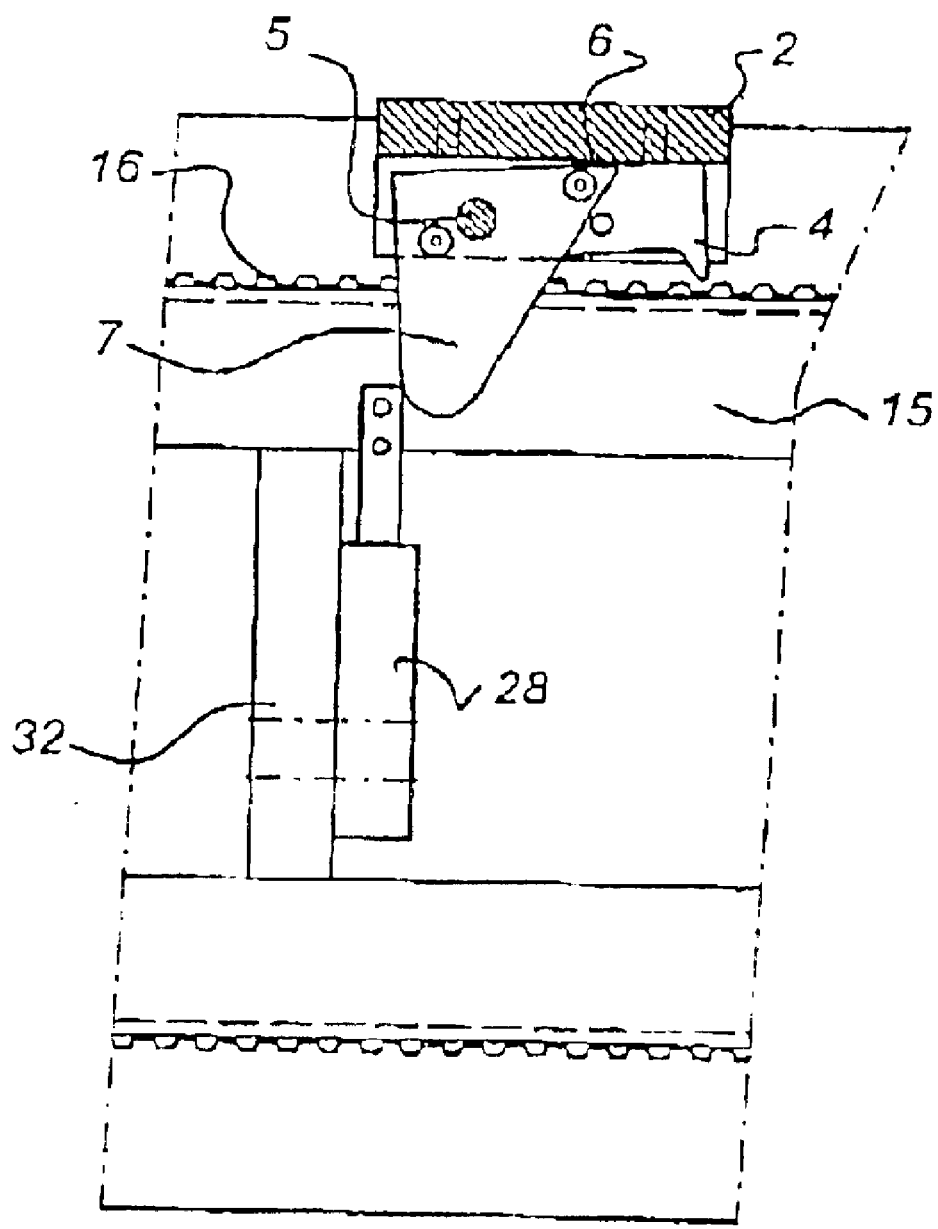
FIG. 3 shows detail A from FIG. 2.

As has already been indicated, a locking pawl 4 is hingeably connected to carrier 2. The free end thereof is pushed into the cavities in toothed belt 16 by means of a spring 6. Consequently, when the toothed belt 16 is moved in the direction of arrow 12 the carriers 2 will move in the same direction locking pawl 4 is also provided with a tab 7. The free end of carrier 2 can be moved out of the toothing of tooted belt 16 by operating this tab 7. This is shown in FIG. 3. Tab 7 can be lifted under the influence of cylinder 28, which is firmly connected to the frame 32, as a result of which locking pawl 4 is freed from the toothed belt 16. As a result the toothed belt 16 can continue to move whilst it is ensured that the carrier 2 is stationary. In contrast to the prior art with this arrangement there is no mutual slip between any part of the carrier 2 and the toothed bolt 16.

In addition to a tab, an auxiliary arm 24 is also hingeably connected at 25 to locking pawl 4. The free end of auxiliary arm 24 is provided with a pin 26 that runs in a groove 27 in the frame 32.

Figure 4:
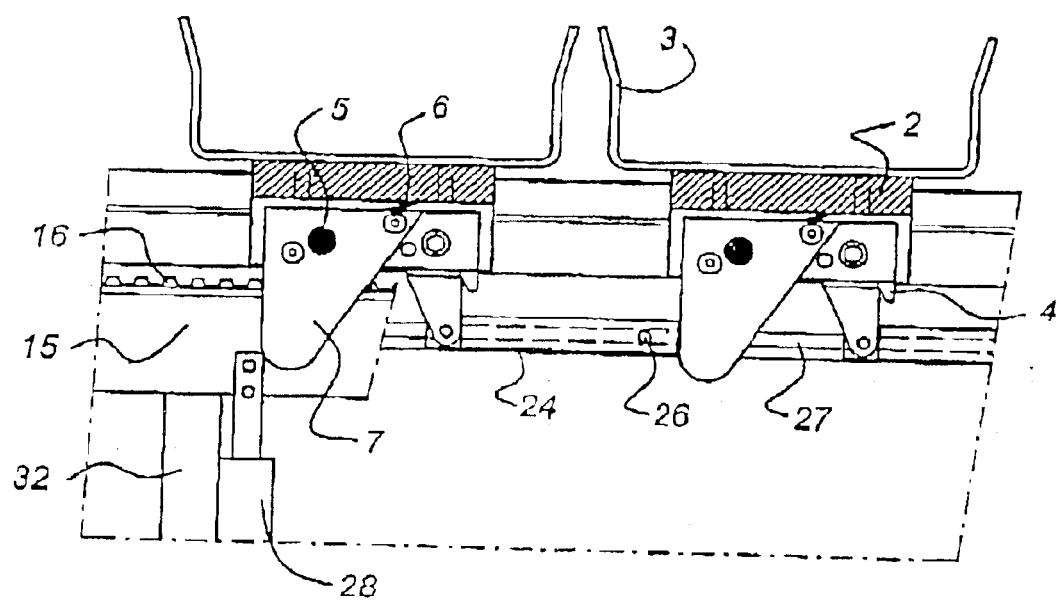
FIG. 4 shows the detail according to FIG. 3 with two carriers.

If the front carrier of a series of carriers 2 becomes stationary, for example with the aid of cylinder 28, the auxiliary arm 24 connected thereto will also become stationary (FIG. 4). The tab 7 of the following carrier moved forward by the toothed belt 16 will come into contact with the free end of auxiliary arm 24 and in this way provide for decoupling of the locking pawl 4 concerned. That is to say, the carriers following the first of a series of carriers no longer have to be restrained by the front or first of said series of carriers by slip acting thereon but are restrained by active decoupling from the toothed belt 16. As soon as the first carrier 2 moves on, coupling of the following carrier 2 with the toothed belt also takes place. In view of the length of the arm 24 there is sufficient time after cylinder 28 has moved backwards briefly for said cylinder to move rapidly back into the path of the tabs 7, so that in principle the following carrier can again be restrained.

In addition to the circulating toothed belt 16 there is a further toothed belt 36 that is fitted such that it is stationary and extends parallel to toothed belt 16. As can be seen from FIG. 6, wheel 17 is also fitted such that it is stationary. This is achieved by the presence of bearings mounted on the rotary shaft 21. Freewheel 29 turns around shaft 30. The freewheel clutch 31 is constructed such that backward movement cannot take place. That is to say, if carrier 2 becomes stationary, for example as a result of operation of cylinder 28, there is no risk that this carrier will move backwards. After all, freewheel 29 in engagement with stationary belt 36 prevents such mutual rotation. During high speed handling of products such as packaged snacks, after stopping of a first carrier to be loaded or unloaded a second carrier will "hit" the first carrier with a relatively high speed. Because of the resiliency of the system, promoted by the pressure of the spring 6, if no additional measures would be taken such a second or third carrier which should be uncoupled from the conveyor would execute a to and fro movement directly behind the first carrier, which is stationary. The rearward movement would be caused by the resiliency of the system and if movement in backward directions on is sufficient, re-engagement by the conveyor will occur after which at engagement of the first stationary carrier uncoupling will result To prevent this repeating process according to the invention, the carriers and frame are provided with cooperating means to prevent movement of the carriers in the direction opposite to the conveyor direction. These operating means can comprise the toothed belt 16 and cooperating free wheel 29. However, it should be understood that also other means can be provided to prevent such a backward movement of the carrier when it becomes stationary. Examples are a wedge-structure which comes effective in the sense of locking if the carrier is moved opposite to the direction of movement of the conveyor belt. An other possibility is a frictional system which also becomes effective if moved in opposite direction to the normal conveyor direction. It is also noted that in stead of toothed belts chains cables or other means can be used.

In the manner described above it is possible in a simple manner to bring a number of containers into a waiting position, then to bring them simultaneously or one by one into a transport position and then to bring them into a free position again, either as a group or individually. By means of the construction described above, accurate positioning of the containers with respect to the surroundings is possible, which is important when loading/unloading.

It will be understood that operation of the locking pawl 4 can take place in any way that can be envisaged in the prior art. Operation can take place by means of a part that is stationary with respect to the frame, but it is also possible to fit operating means on the carrier. After all, as a result of the present invention it is no longer necessary actively to restrain carrier 2 after decoupling of locking pawl 4, as was the case in the state of the art with the construction using slip.

This also means that the motor power employed can be lower since the effects of friction, such as the production of heat and particles, are no longer present.

Detection of the various carriers can be carried out by any method known in the state of the art, such as by means of light. It will be understood that instead of a toothed belt it is also possible to use a chain or the like. These and further modifications fall within the scope of those killed in the art after reading the above description and within the scope of the appended claims.

What is claimed is:

1. Device for moving products from a loading station to an unloading station, comprising:

a multiplicity of carriers, each having a container for said products;

a transport device for moving said carriers, which transport device comprises:

a frame;

a drive for said carriers, the drive being connected to the frame so as to allow circulation of the drive;

guide means for said carriers; and engagement means for bringing said carriers into engagement with said drive;

wherein said drive is provided with recesses and said carrier is provided with an engagement member that extends into said recesses while in a first position, but does not extend into said recesses while in a second position, operating means being present in order to move said engagement member out of the recesses, wherein said carrier and frame are provided with cooperating means separate from the engagement means allowing for displacement of said carrier in an allowed direction relative to said frame and preventing displacement of said carrier in an opposite direction relative to said frame, the cooperating means comprising a first member on the carrier and a second member on the frame, the first and second member engaging one another so that the carrier can be displaced with respect to the frame in the allowed direction, and further so that the carrier cannot be displaced with respect to the frame in a direction opposite the allowed direction.

2. Device according to claim 1, wherein said operating means are connected to the frame.

3. Device according to claim 1, wherein said engagement member is hingeably fixed to said carrier.

4. Device according to claim 1, wherein said drive comprises a toothed belt above which (in the transport position) said carrier is fitted.

5. Device according to claim 1, wherein said carrier is provided with further operating means (24) for operating the engagement member of a following carrier in the direction of transport.

6. Device according to claim 1, wherein said first member of the cooperating means on said carrier comprise a wheel rotatably attached to the carrier so that the wheel can rotate in an allowed rotational direction corresponding to the allowed direction of displacement of the carrier, and is locked from rotation in a direction opposite the allowed rotational direction, which wheel (29) engages said frame.

7. Device according to claim 6, wherein said wheel comprises a toothed wheel and said second member of the frame comprises a set of teeth for engagement by said wheel.

8. Device according to claim 7, wherein said set of teeth is disposed on a stationary toothed belt (36).

9. Device according to claim 4, further comprising a second toothed belt, and wherein the two toothed belts are arranged alongside one another.

10. Device according to claim 1, wherein said cooperating means comprise wedge means.

11. Device according to claim 1, wherein said cooperating means comprise a portion of said frame and a portion of said carrier which frictionally engage in said opposite direction.

* * * * *